(12) United States Patent
Masputra et al.

(10) Patent No.: US 8,265,078 B2
(45) Date of Patent: Sep. 11, 2012

(54) ROUTING TABLE BUILD ALGORITHM FOR A ROUTING TABLE THAT USES A SEARCH KEY CONSTRUCTED FROM PACKET DESTINATION ADDRESS AND OUTBOUND INTERFACE

(75) Inventors: Cahya Masputra, San Jose, CA (US); Dieter Siegmund, Santa Cruz, CA (US); Vincent Lubet, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 285 days.

(21) Appl. No.: 12/242,548

(22) Filed: Sep. 30, 2008

(65) Prior Publication Data
US 2009/0304006 A1    Dec. 10, 2009

Related U.S. Application Data

(60) Provisional application No. 61/059,778, filed on Jun. 8, 2008.

(51) Int. Cl.
G06F 15/173 (2006.01)
H04L 12/28 (2006.01)
H04L 12/56 (2006.01)

(52) U.S. Cl. .............. 370/392; 370/395.31; 370/395.32; 709/238

(58) Field of Classification Search ............. 370/395.31, 370/395.32, 392; 709/238
See application file for complete search history.

(56) References Cited

U.S. PATENT DOCUMENTS

| | | | |
|---|---|---|---|
| 5,410,543 A | 4/1995 | Seitz et al. | |
| 6,064,671 A * | 5/2000 | Killian | 370/389 |
| 6,185,213 B1 | 2/2001 | Katsube et al. | |
| 6,674,756 B1 | 1/2004 | Rao et al. | |
| 6,956,854 B2 | 10/2005 | Ganesh et al. | |
| 6,957,274 B2 * | 10/2005 | Trace et al. | 709/242 |
| 6,980,515 B1 | 12/2005 | Schunk et al. | |

(Continued)

FOREIGN PATENT DOCUMENTS

EP    1 429 497 A1    6/2004
(Continued)

OTHER PUBLICATIONS

International Search Report, PCT/US2009/046182, Aug. 21, 2009, 6 pages.

(Continued)

*Primary Examiner* — Ayaz Sheikh
*Assistant Examiner* — Tarell Hampton
(74) *Attorney, Agent, or Firm* — Blakely, Sokoloff, Taylor & Zafman LLP

(57) ABSTRACT

A method is described that involves, in view of a first default entry for a first subnet that is reachable through a first network service, where the first default entry has a numeric destination value, and in view of a second default entry for a second subnet that is reachable through a second network service, wherein the second default entry has the numeric destination value, sorting the first and second default entries by deciding that the first network service is ranked higher than the second network service. The method further involves configuring the first default entry within a routing table to have the numeric destination and not an interface component within the first default entry's search term, and, configuring the second default entry within the routing table to have the numeric destination and the second network service's interface component within the second default entry's search term.

31 Claims, 12 Drawing Sheets

U.S. PATENT DOCUMENTS

| | | | |
|---|---|---|---|
| 7,039,018 B2 | 5/2006 | Singh et al. | |
| 7,106,740 B1 | 9/2006 | Leelanivas et al. | |
| 7,142,541 B2 | 11/2006 | Kumar et al. | |
| 7,269,174 B2 | 9/2007 | Olson et al. | |
| 7,610,401 B2 * | 10/2009 | Van Ackere et al. | 709/238 |
| 2002/0003799 A1 * | 1/2002 | Tomita | 370/392 |
| 2002/0012320 A1 | 1/2002 | Ogier et al. | |
| 2003/0086425 A1 | 5/2003 | Bearden et al. | |
| 2004/0028040 A1 | 2/2004 | Kumar et al. | |
| 2004/0095897 A1 * | 5/2004 | Vafaei | 370/254 |
| 2004/0132451 A1 | 7/2004 | Butehorn et al. | |
| 2005/0165958 A1 * | 7/2005 | Uzawa et al. | 709/238 |
| 2005/0289231 A1 | 12/2005 | Harada et al. | |
| 2006/0056384 A1 | 3/2006 | Ishii et al. | |
| 2007/0022479 A1 | 1/2007 | Sikdar et al. | |
| 2007/0058606 A1 | 3/2007 | Koskelainen | |
| 2007/0073805 A1 | 3/2007 | Jorgensen | |
| 2007/0288653 A1 | 12/2007 | Sargor et al. | |
| 2009/0240780 A1 | 9/2009 | Brown | |
| 2009/0304000 A1 | 12/2009 | Masputra et al. | |
| 2009/0304001 A1 | 12/2009 | Masputra et al. | |
| 2009/0304005 A1 | 12/2009 | Masputra et al. | |
| 2010/0017535 A1 | 1/2010 | Aloni et al. | |
| 2010/0020753 A1 | 1/2010 | Fulknier et al. | |

FOREIGN PATENT DOCUMENTS

| | | |
|---|---|---|
| EP | 1429497 | 6/2004 |

OTHER PUBLICATIONS

PCT Written Opinion, PCT/US2009/046182, Aug. 21, 2009, 7 pages.
"Unicast IPv6 Addresses, Microsoft Corporation, TechNet", Updated: Jan. 21, 2005, 4 pages.
Thaler, D, "Evolution of the IP Model, Networking Group, Internet-Draft", Jul. 7, 2008, 8 pages.
PCT/US2009/046182, "International Preliminary Report on Patentability and Written Opinion of the International Searching Authority", pp. 1-8, (Dec. 13, 2010).
Notice of Allowance from U.S. Appl. No. 12/242,499 mailed Jan. 3, 2011, 8 pages.

* cited by examiner

| DEST | NEXT NODE | I/F |
|---|---|---|
| 192.168.1 | | en_1 |
| 192.168.2 | | en_2 |
| DEFAULT | 192.168.1.11 | en_1 |
| | | |

211 → (row 1), 212 → (row 2), 210a

FIG. 2A (PRIOR ART)

| DEST | NEXT NODE | I/F |
|---|---|---|
| 192.168.1 | | en_1 |
| 192.168.1.10 | | en_1 |
| DEFAULT | 192.168.1.11 | en_1 |
| 192.168.2 | | en_2 |
| | | |

210b; 211 → (row 1), 213 → (row 2), 212 → (row 4)

FIG. 2B (PRIOR ART)

| DEST | NEXT NODE | I/F |
|---|---|---|
| 192.168.1 | | en_1 |
| 192.168.1.10 | 00:aa:bb:cc:dd:ee | en_1 |
| DEFAULT | 192.168.1.11 | en_1 |
| 192.168.2 | | en_2 |
| | | |

210c; 211 → (row 1), 213 → (row 2)

FIG. 2C (PRIOR ART)

| | DEST | NEXT NODE | I/F | 210d |
|---|---|---|---|---|
| 211 → | 192.168.1 | | en_1 | |
| 213 → | 192.168.1.10 | 00:aa:bb:cc:dd:ee | en_1 | |
| | DEFAULT | 192.168.1.11 | en_1 | |
| 212 → | 192.168.2 | | en_2 | |
| 214 → | 192.168.2.10 | 00:11:22:33:44:55 | en_2 | |
| | | | | |

FIG. 2D (PRIOR ART)

| | DEST | NEXT NODE | I/F | 210e |
|---|---|---|---|---|
| 211 → | 192.168.1 | | en_1 | |
| 213 → | 192.168.1.10 | 00:aa:bb:cc:dd:ee | en_1 | |
| 217 → | 192.168.1.11 | 00:aa:bb:cc:dd:ff | en_1 | |
| | DEFAULT | 192.168.1.11 | en_1 | |
| 212 → | 192.168.2 | | en_2 | |
| 214 → | 192.168.2.10 | 00:11:22:33:44:55 | en_2 | |
| 215 → | 10.11.12.13 | 192.168.1.11 | en_1 | |
| 216 → | 17/8 | | WAN_2 | |

FIG. 2E (PRIOR ART)

| | DEST | NEXT NODE | I/F | 210f |
|---|---|---|---|---|
| 211 → | 192.168.1 | | en_1 | |
| 213 → | 192.168.1.10 | 00:aa:bb:cc:dd:ee | en_1 | |
| 217 → | 192.168.1.11 | 00:aa:bb:cc:dd:ff | en_1 | |
| 218 → | DEFAULT | 192.168.1.11 | en_1 | |
| 212 → | 192.168.2 | | en_2 | |
| 214 → | 192.168.2.10 | 00:11:22:33:44:55 | en_2 | |
| 219 → | 1.2.3.4 | 192.168.1.11 | en_1 | |
| 215 → | 10.11.12.13 | 192.168.1.11 | en_1 | |
| 216 → | 17/8 | | WAN_2 | |

FIG. 2F (PRIOR ART)

| DEST | NEXT NODE | I/F |
|---|---|---|
| 192.168.1 | | en_1 |
| 192.168.1.10 | 00:aa:bb:cc:dd:ee | en_1 |
| 192.168.1.11 | 00:aa:bb:cc:dd:ff | en_1 |
| 220 → DEFAULT | | WAN_1 |
| 192.168.2 | | en_2 |
| 192.168.2.10 | 00:11:22:33:44:55 | en_2 |
| 10.11.12.13 | 192.168.1.11 | en_1 |
| 17/8 | | WAN_2 |
| 221 → 5.6.7.8 | | WAN_1 |
| | | |

FIG. 2G
(PRIOR ART)

| DEST + I/F | NEXT - HOP | I/F |
|---|---|---|
| 192.168.1 + en_1 | | en_1 |
| DEFAULT + en_1 | 192.168.1.11 | en_1 |
| 192.168.1.10 + en_1 | 00:aa:bb:cc:dd:ee | en_1 |
| 192.168.1.11 + en_1 | 00:aa:bb:cc:dd:ff | en_1 |
| 192.168.2.10 + en_1 | 00:aa:bb:cc:dd:ff | en_1 |
| 1.2.3.4 + en_1 | 00:aa:bb:cc:dd:ff | en_1 |
| 5.6.7.8 + en_1 | 00:aa:bb:cc:dd:ff | en_1 |
| 192.168.2 + en_2 | | en_2 |
| DEFAULT + en_2 | 192.168.2.11 | en_2 |
| 192.168.2.10 + en_2 | 00:11.22:33.44.55 | en_2 |
| 192.168.2.11 + en_2 | 00:aa:bb:cc:dd:gg | en_2 |
| 192.168.1.10 + en_2 | 00:aa:bb:cc:dd:gg | en_2 |
| 1.2.3.4 + en_2 | 00:aa:bb:cc:dd:gg | en_2 |
| 5.6.7.8 + en_2 | 00:aa:bb:cc:dd:gg | en_2 |
| 192.168.1 + en_4 | | en_4 |
| 192.168.1.10 + en_4 | 00.11.22.33.44.66 | en_4 |

401 → DEFAULT + en_1
415 → 192.168.1.10 + en_1
420 → 192.168.1.11 + en_1
403 → 192.168.2.10 + en_1
411 → 1.2.3.4 + en_1
414 → 5.6.7.8 + en_1
402 → DEFAULT + en_2
416 → 192.168.2.10 + en_2
418 → 192.168.2.11 + en_2
404 → 192.168.1.10 + en_2
413 → 1.2.3.4 + en_2
412 → 5.6.7.8 + en_2
417 → 192.168.1.10 + en_4

FIG. 4

|  | DEST + I/F | NEXT NODE | I/F |
|---|---|---|---|
| 501 → | DEFAULT |  | WAN_1 |
| 502 → | 10.11.12.13 + en_1 | 192.168.1.11 + en_1 | en_1 |
| 503 → | 17/8 + en_1 |  | WAN_2 |

FIG. 5

ROUTING TABLE BUILD ALGORITHM FOR A ROUTING TABLE THAT USES A SEARCH KEY CONSTRUCTED FROM PACKET DESTINATION ADDRESS AND OUTBOUND INTERFACE

CLAIM TO PRIORITY

This application claims priority from U.S. Provisional Application Ser. No. 61/059,778, filed on Jun. 8, 2008, the disclosure of which is hereby incorporated by reference for all purposes.

BACKGROUND

FIG. 1 shows a prior art computing system 101 that is communicatively coupled to a plurality of Local Area Networks (LANs) and Wide Area Networks (WANs). As observed in FIG. 1, each of LANs 103_1 through 103_4 is a local area network to which the computing system 101 is directly connected. Examples of such local area networks include standard "Layer 2" networks such as IEEE 802.3 based networks (e.g., Ethernet networks) and IEEE 802.11 based networks (e.g., Wireless/WLAN networks).

As depicted in FIG. 1, each of the LANs 103_1 through 103_4 is a subnet within a larger "Layer 3" (e.g., Internet Protocol (IP)) network. Note that at least two separate Layer 3 networks 104_1, 104_2 are observed in FIG. 1 (e.g., a first IP network 104_1 that is separate and isolated from a second IP network 104_2). The computing system is also coupled to WANs 104_3 and 104_4 (noting that each of Layer 3 networks 104_1, 104_2 could also be WANs). The computing system 101 is directly connected to WAN 104_3 and remotely coupled to WAN 104_4.

The computing system 101 contains separate interfaces for communication into the subnets 103_1 through 103_4 and WANs 104_3 and 104_4. That is, interfaces 102_1 through 102_4 are interfaces for subnets 103_1 through 103_4, respectively, and, interfaces 102_5 and 102_6 are interfaces for WANs 104_3 and 104_4, respectively. Here, each interface has: 1) an "end-point" address (e.g., an IP address) that corresponds to an address of the computing system 101 on a particular network; and, 2) functionality for executing protocols that are specific to the particular network.

Transmitting packets into a particular network is accomplished by submitting payload data to the corresponding interface. The interface and its associated functionality responds by encapsulating the payload data with appropriate protocol information to form a packet for its respective network. The existence of an interface therefore represents the existence of a "network service" in the sense that the computing system maintains functionality for forming packets for transportation within a particular network.

FIG. 1 also shows a routing table 110 within the prior art computing system 101. The routing table identifies, based on an outbound packet's destination address, an appropriate network interface for that packet. In the case of subnets, the routing table also identifies the packet's MAC layer destination address within the subnet. The following discussion illustrates by way of example the manner in which routing table entries are added and used according to the prior art approach. Specifically, FIGS. 2a through 2d pertain to the manner in which entries for subnets 103_1 through 103_4 are added and used. FIGS. 2e through 2g pertain to the manner in which entries for WANs 104_3 and 104_4 are used.

As observed in FIG. 2a, two initial entries are observed 211 and 212 for subnets 103_1 and 103_2—both of which are Ethernet LANs. As observed in FIG. 2a, an entry for a LAN identifies: 1) the LAN's address as a "destination"; and, 2) the LAN's network interface within the system 101. For instance, entry 211 identifies: 1) subnet address 192.168.1 as the destination; and, 2) interface "en_1" which is the interface for subnet 103_1.

As will be observed immediately below by way of example, once a subnet route entry exists, the computing system is able to resolve for specific destination addresses within the subnet. For the routing table state 210a observed in FIG. 2a, when a need to send a packet to a particular end point destination or "host" on either of subnets 103_1 or 103_2 arises, the host's destination address is used as a look up parameter for performing a "longest prefix match" search in the destination address column of the routing table 210a. Thus, for example, if a need arises to send a packet to an end-point within system 105_1 (located on subnet 103_1) having destination address 192.168.1.10, a look-up is performed in the routing table 210a using 192.168.1.10 as a look up parameter. The longest prefix match will hit on entry 211 (since 192.168.1 is a deeper match than the default entry).

The computing system 101 is able to recognize, however, that entry 211 only identifies a subnet (192.168.1) and not a particular host on that subnet (192.168.1.10). As such, as observed in FIG. 2b, the computing system adds another entry 213 in the routing table 210b specifically for the host destination. Entry 213 is referred to as a "route" because it identifies a specific host or end-point destination. The addition of new route 213 is also consistent with the ARP protocol associated with IPv4 subnets in that it includes the additional detail of a specific IP destination address (192.168.1.10) but, at least initially, only duplicates or "clones" the interface information (en_1) of the subnet network service entry 211.

For new host routes within a subnet, such as route entry 213, the computing system 101 will attempt to further resolve the route 213 for additional destination address information that is specific to the subnet (e.g., a specific MAC layer address within the subnet). Specifically, the computing system 101 will launch an ARP packet into subnet 103_1 to identify the MAC address for the system on subnet 103_1 that includes IP address 192.168.1.10. Because system 105_1 has this endpoint, the subnet 103_1 will return the Ethernet MAC address of system 105_1.

Upon receipt of the MAC address for system 105_1 from subnet 103_1, the computing system 101 will enter the MAC address for system 105_1 (00:aa:bb:cc:dd:ee) as the next node for entry 213. This state is observed as state 210c in FIG. 2c. Thus, a subsequent look up on destination 192.168.1.10 in the table will return the next node for that destination (i.e., MAC address (00:aa:bb:cc:dd:ee)) and the interface from which a packet sent by computing system should be sent in order to reach that destination (i.e., interface "en_1" 102_1). Thus, the next node column in the routing table (where applicable) identifies, for a specific entry in the routing table's destination column, the appropriate network node that the computing system 101 should send the packet to.

If a need to send a packet to destination address 192.168.2.20 within system 105_2 on subnet 103_2 arises, the same process repeats itself resulting ultimately in new route entry 214 that specifies, as observed in FIG. 2d, the MAC address of system 105_5 (00:11:22:33:44:55) as the next node for that destination and the interface ("en_2" 102_2) from which a packet sent by computing system should be sent in order to reach that destination.

Here, both of entries 213, 214 identify an interface that transmits into a subnet. (specifically, entry 213 identifies interface en_1 which transmits into subnet 103_1 and entry

214 identifies interface en_2 which transmits into subnet 104_1) Properties of an interface that transmits into a subnet include a capability to articulate any one of multiple destination addresses within the header information created by the interface. As a consequence of this property, subnet representations within the routing table typically include multiple entries/destinations for a same subnet interface.

For instance, if additional end-point destinations 192.168.2.11, 192.168.2.12 and 192.168.3.13 existed on subnet 103_2, three additional entries would be observed in FIG. 2d beneath entry 214—one entry for each of these IP addresses that specifies its own unique MAC address. Here, over the course of operation, the subnet interface en_1 102_1 is expected to be able to create header information that includes any one of these MAC addresses as appropriate.

Interfaces for "non subnets" also exist. Examples include an interface for a Virtual Private Network (VPN) and an interface for a Point-to-Point (PPP) link over a physical transport medium (such as PPP over a modem connection or PPP over Ethernet (PPPoE)). Because interfaces such as these, from their own isolated perspective, do not transmit into a subnet—they do not include the ability to identify a range of possible destinations within the header information they construct. As a consequence, the structure of their corresponding representations within the routing table differ from those of a subnet.

FIG. 1 supports some examples. Specifically, assume the WAN_1 interface 102_5 is a PPP interface whose corresponding packets are transmitted over a direct connection to the Internet (WAN_1) 104_3, and, assume the WAN_2 interface 102_6 is a VPN interface configured to transmit packets to a server 105_6 that provides access to a VPN WAN_2 104_4.

In the case of the PPP interface 102_5, which may be for a PPP over modem connection or a PPP over Ethernet (PPPoE) connection into WAN_1 104_3, the PPP interface 102_5 encapsulates IP packets destined for transport within the WAN_1 with appropriate PPP headers and forwards them to an access node to WAN_1 (not shown) which strips off the PPP headers and "dumps" the IP packets into WAN_1. The PPP headers created by the interface 102_5 are not capable of uniquely identifying a range of possible destination addresses because all packets created by the PPP interface 102_5 are sent directly to this access node.

The VPN interface 102_6 encapsulates packets for transportation within WAN_2 104_4 with an IP packet whose destination address (10.11.12.13) specifies node 105_6. That is, WAN interface 102_6 is designed to construct a packet that will reach the access node 105_6 to WAN_2. As such, like the PPP interface 102_5, the header information created by the VPN interface 102_6 is not capable of uniquely identifying a range of possible destination addresses because all packets created by the VPN interface 102_6 are sent directly to the WAN_2 access node 105_6.

FIG. 2e shows the presence of a routing table entries 215, 216 for the VPN interface 102_6 and corresponding WAN_1 104_4. Routing table entries for the PPP interface 102_5 and WAN_1 will be discussed in more detail further below. With respect to the VPN, two entries 215, 216 are created in the routing table as observed in FIG. 2e. A first entry 215 lists the IP address of the VPN access node 105_6 (10.11.12.13) as a destination and the subnet gateway 106 (IP address=192.168.1.11) used to reach the access node as a next node that computing system 101 transmits to. A second entry 216 lists the portion of a destination address that identifies WAN_2 ("17/8") as a destination and identifies the WAN_2 interface 102_6 as the appropriate interface.

Upon submission of these entries to the routing table, the following operations transpire. WAN_2 has address "17/8" so packets destined for WAN_2 will have an address that begins with "17/8". For instance, a packet destined for node 105_7 will be labeled 17/8.1.2.3. Submission of this destination address to the routing table results in a hit on entry 216 because that is deepest match amongst the destination addresses listed in the routing table. Entry 216 identifies the WAN_2 interface 102_6. As such, an outbound packet having destination address 17/8.1.2.3 is processed by interface 102_6 which, as discussed previously, includes encapsulation with an IP packet having a destination address that identifies access node 105_6 (10.11.12.13). At this point an IP packet having destination address 10.11.12.13 has been created which causes a second lookup into the routing table.

Destination address 10.11.12.13 will hit on entry 215 which returns the identity of gateway 106 (IP address=192.168.1.11). A lookup on IP address 192.168.1.11 returns a hit on entry 211 which causes, in accordance with the manner in which entries 213 and 214 were created, the addition of an entry 217 for gateway 106 (having MAC address 00:aa:bb:cc:dd:ff) within subnet 103_1. Thus, a lookup on entry 192.168.1.11 ultimately returns the MAC address of gateway 106 and the identity of the en_1 interface 102_1. Ultimately therefore, the outbound IP packet created by the WAN_2 interface 102_6 having the IP address of the VPN access node 105_6 is encapsulated with Ethernet headers by the en_1 interface 102_1 that specify the MAC address of gateway 106. The Ethernet packet is then transmitted into subnet 103_1. Subsequent packets whose destination address specify network "17/8" will cause an identical chain of processes (except that entry 217 does not need to be created because it now exists in the routing table). In this manner, a destination address is continually resolved until no further resolution of destination addresses and interfaces remain.

FIGS. 2a through 2f also show the presence of a default entry 218. In the prior art approach, the default entry 218 was used as a "catch all" to route packets whose destination addresses did not hit on a more specific entry in the routing table into a particular network. As observed, the default entry 218 also identifies the gateway 106 for subnet 103_1. Thus, as presently observed in FIG. 2f, a packet whose destination address fails to more specifically match to another routing table entry will be forwarded into network 104_1 through gateway 106. As an example, consider a packet whose IP destination address is 1.2.3.4. Submission of this destination address to the routing table results in a deepest match hit on the default entry 218 as compared to the other entries observed in the routing table (in the prior art approach, the default entry was set to 0.0.0.0).

As a result of the hit on the default entry 218, the packet is encapsulated with Ethernet headers by the en_1 interface that specify the MAC address of gateway 106 as the destination. Also, an entry 219 for destination address 1.2.3.4 is entered into the routing table listing the gateway 106 of subnet 103_1 as the next node. Thus, a subsequent submission for destination 1.2.3.4 will hit on entry 219 which returns the IP address of gateway 106 (192.168.1.11) which causes another lookup in the routing table which hits on entry 217. The result of this hit is the transmission of the packet from en_1 into subnet 103_1 encapsulated with the MAC address of gateway 106.

A problem with the prior art approach, however, was that only one default entry was present in the routing table at any given time resulting in, among other problems, the inability of the computing system 101 to transmit packets into all of the networks it was coupled to. For instance, PPP interface 102_5 is only useable if WAN_1 is configured to be the default.

Here, recall that the VPN has a specific numeric identifier "17/8" while WAN_1 has no such specific numeric identifier. In the present example being discussed, WAN_1 is the Internet which is a collection of different networks having different numeric identifiers but no single numeric reference identifies the Internet particularly. Thus, packets destined for the Internet essentially have random destination addresses (like 1.2.3.4) which—at least initially—will only hit on the default entry. Thus, in the prior art approach, in order to send packets into network WAN_1 104_3, the default entry had to be changed from the state observed in FIG. 2f to the state observed in FIG. 2g.

Here, FIG. 2g shows the default entry 220 after it has been changed to WAN_1 (e.g., to configure Internet service for computing system 101). A background process also detected the change and removed entry 219 (because that was presumed valid for a different network). Here, submission of an IP packet destined for the Internet 104_3 having an essentially random destination address (e.g., IP address=5.6.7.8) will hit on the default entry 220 which returns the identity of the PPP interface WAN_1 102_5. The PPP interface appends PPP headers to the IP packet and transmits the PPP packet to the access node for WAN_1 (not shown) which strips off the PPP headers and dumps the packet into the Internet/WAN_1. An entry 221 is created in the routing table for destination address 5.6.7.8 that identifies the WAN_1 interface.

A problem with the prior art approach is that network destinations on different networks which required the use of the default entry to be reached could not be concurrently reached. For instance, if network 104_1 was isolated from the Internet, and another packet to the 1.2.3.4 destination address on network 104_1 was submitted to the routing table observed in FIG. 2f, the packet would improperly be sent into the Internet 104_3 rather than network 104_1 because the default entry 220 no longer points to network 104_1.

Another problem is asymmetric input/output flows. For instance, computing system 101 can receive multiple input streams from network 104_1 via its connection to that network through multiple interfaces en_1 through en_3. Because of the single default entry (e.g., gateway 106), however, input flows arriving to interfaces en_1 through en_3 from beyond their respective subnets 103_1 through 103_3 could only be responded to through the same subnet via the default entry. So, for instance, interface en_1 would transmit to all hosts beyond subnets 103_1 through 103_3 even though interfaces en_, en_2 and en_3 were receiving packets from these hosts (here, recall that each interface has its own IP address on network 104_1). Interface en_1 would therefore be required to process more than a pro rata share of the traffic being received by system 101 resulting in a potential bottleneck.

Another problem was the inability to handle identical destination addresses on different networks. According to the manner in which entries were added and listed in the routing table, a same destination address would always be sent from the same interface.

BRIEF DESCRIPTION OF THE FIGURES

The present invention is illustrated by way of example and not limitation in the figures of the accompanying drawings, in which like references indicate similar elements and in which:

FIGS. 2a through 2g show pertinent aspects of the prior art routing table;

FIG. 4 shows pertinent aspects of an embodiment of an improved routing table;

FIG. 5 shows additional pertinent aspects of an embodiment of an improved routing table;

DETAILED DESCRIPTION

Figure 1:
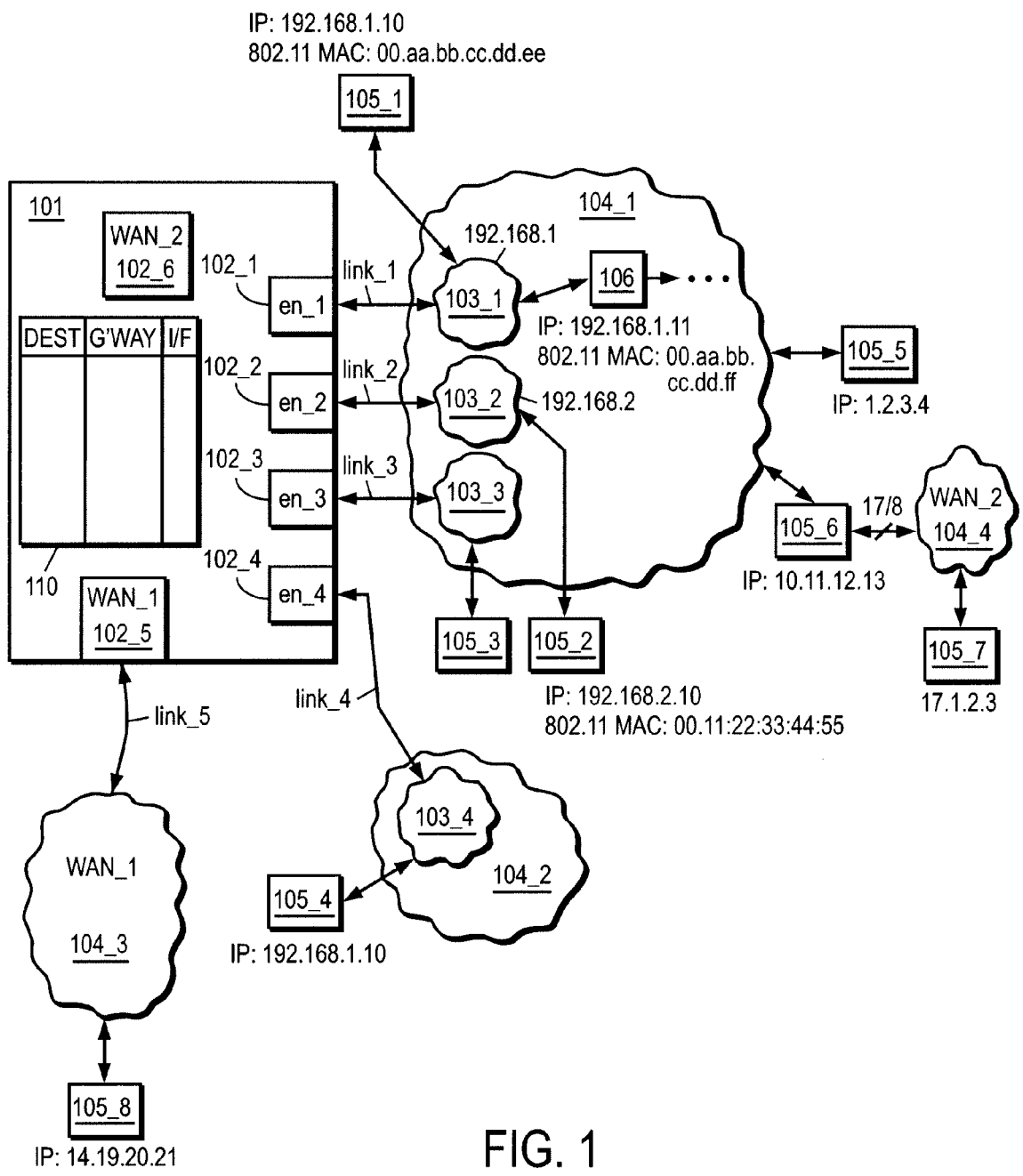
FIG. 1 shows a networking implementation with a prior art routing table.
Figure 3:
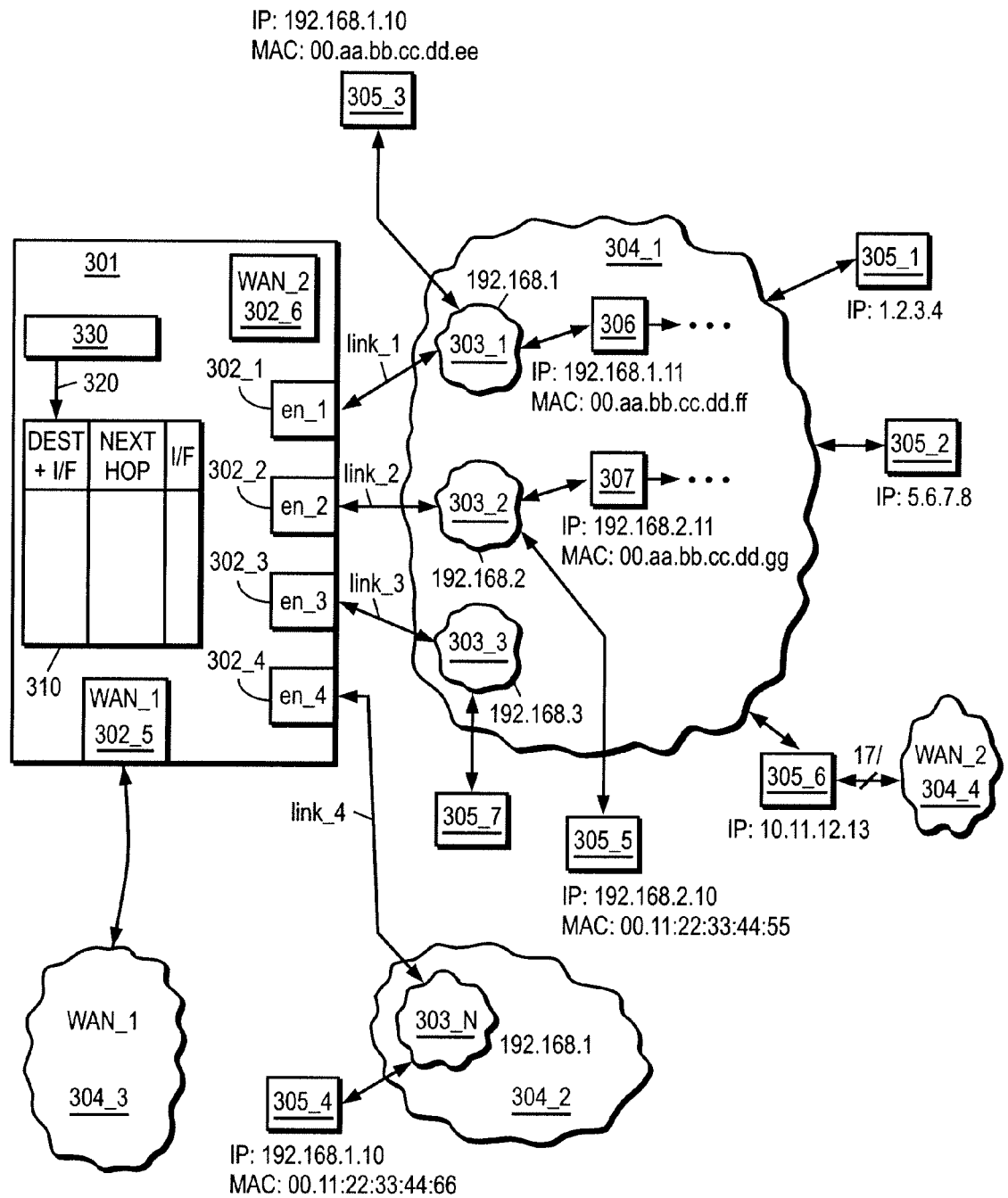
FIG. 3 shows a networking implementation with an improved routing table.

FIG. 3 shows an improved architecture that includes a routing table 310 which provides next nodal hop information in response to an input key 320 formulated from a destination address and an indication of an appropriate outbound interface. Thus, in comparison to the prior art routing table of FIGS. 2a through 2g which only receives a destination address as a look-up key, the improved routing table 310 uses both a destination address and the identity of a specific interface as a look-up key 320. Because the look-up key 320 of the improved approach includes more information than the look-up key of the prior art approach, as explained in more detail below, the computing system 301 of FIG. 3 is able to implement a number of possible improvements over the prior art system such as, among other possibilities, multiple default entries which permits proper handling of multiple networks having varied destination address spaces, symmetric input/output flows, and correct handling of identical destination addresses within different networks. Each of these features are described in more detail further below.

In order to provide an input key 320 that includes both a destination address and an appropriate outbound interface, an additional functional layer 330 is depicted in FIG. 3 residing "above" the routing table 310 that has the responsibility of determining the correct outbound interface in view of certain conditions under which an outbound packet is being transmitted. When the correct outbound interface is determined, its identity is essentially presented to the routing table 310 along with the outbound packet's destination address. Functional layer 330 can be implemented in any number of ways.

For instance, according to a first "purely centralized" approach, applications or services within computing system 301 are configured to request functional layer 330 to determine the correct outbound interface for an outgoing packet in view of the current set of conditions. According to a second "purely distributed" approach, applications or services within computing system 301 are written to determine on their own accord which outbound interface is proper for the outgoing packets they submit or handle. A continuum of architectures that invoke a mixture of centralized and distributed approaches exist between these two extremes.

Note the following features in FIG. 3: 1) hosts 305_1 and 305_2 are connected to the same network 304_1 that interfaces 302_1 through 302_3 are connected to but are reachable only through default entries; 2) subnets 303_1 through 303_3 are part of a different network 304_1 than the network 304_2 to which interface 302_4 is connected to; 3) hosts 305_3 and 305_4, being respectively attached to different networks 304_1 and 304_2, happen to have identical destination addresses. These features are pertinent to some potential advantages of the improved approach that are described immediately below. A discussion of various protocols/methodologies for building the contents of the routing table are discussed thereafter. FIG. 4 shows a routing table embodiment 410 for the exemplary embodiment of FIG. 3.

Symmetric Input/Output Traffic Flows

The potential of the improved approach to engage in symmetric communication exchanges to hosts residing beyond a local subnet becomes evident through an analysis of communication exchanges between system 301 and hosts 305_1 and 305_2. As mentioned just above hosts 305_1 and 305_2 are connected to the same network 304_1 that interfaces 302_1 through 302_3 are connected to but neither resides on a subnet to which computing system 301 is directly coupled. As such, both of hosts 305_1 and 305_2 must be reached through a default entry.

Assume that host 305_1 sends packets to the IP address associated with interface 302_1, and, host 305_2 sends packets to the IP address associated with interface 302_2. Assuming the computing system 301 is able to entertain and continue respective communication sessions with hosts 305_1 and 305_2, note that the prior art approach by way of its single default entry will impose that all outgoing packets sent from system 301 to hosts 305_1 and 305_2 must be sent over the same interface and subnet gateway that the single default entry identifies (e.g., gateway 306 on subnet 303_1).

By contrast, functional layer 330 of the improved design may be configured to "track" which interface a communication session request or packet arrived on and render a determination that outgoing packets for such communication sessions are sent over the same interface that their corresponding request/packet arrived at (i.e., interface 302_1 for packets to be sent to host 305_1 and interface 302_2 for packets to be sent to host 305_2). As such, when computing system 301 prepares outgoing packets for both hosts 305_1 and 305_2, the functional layer 330 will determine that interface 302_1 is preferred for the packet to be sent to host 305_1 and interface 302_2 is preferred for the packet to be sent to host 305_2.

As such, a first search key will be built for the packet to be sent to host 305_1 that is constructed from the destination address of host 305_1 and the identity of interface 302_1. Likewise, a second search key will be built for the packet to be sent to host 305_2 that is constructed from the destination address of host 305_2 and the identity of interface 302_2. The first search key will hit on entry 411 (which has the destination address of host 305_1 and the identity of interface 302_1 in the search column) of routing table 410 of FIG. 4 and the second search key will hit on entry 412 (which has the destination address of host 305_2 and the identity of interface 302_2 in the search column) of routing table 410. Entry 411 identifies the MAC address of the gateway router 306 for subnet 303_1 as the next hop and entry 412 identifies the MAC address of the gateway router 407 for subnet 303_2 as the next hop. Thus the packet for host 305_1 will be sent to gateway router 306 and the packet for host 305_2 will be sent to gateway router 307.

It is pertinent to point out the manner in which entries 411 and 412 were initially created. For entry 411, the initial outbound packet for host 305_1 created an initial search key that included the destination address of host 305_1 (1.2.3.4) and the identity of interface en_1. This caused a deepest match hit on the default entry 401 for the en_1 interface. As such, similar to the prior art process, new entry 411 was created that initially listed the IP address of the subnet 303_1 gateway as the next node (192.168.1.11). Through the ARP process, the IP address of gateway 306 was replaced in the next node column of entry 411 with the Ethernet MAC address of the gateway 406. This is the form of entry 411 as presented in FIG. 4.

Entry 412 was created in a similar fashion, noting however, that the initial hit for a search key constructed from destination 5.6.7.8 and en_2 was the default entry 402 for subnet 303_2. This resulted in the gateway 307 for subnet 303_2 being identified as the next node for entry 412. Thus, because both of subnets 303_1 and 303_2 have respective default entries within the routing table, essentially both of interfaces en_1 303_1 and en_2 303_2 can support the transmission of essentially random destination address spaces.

Note that the routing table 410 of FIG. 4 is able to preserve the arrival/departure symmetry if a second set of packets from hosts 305_1 and 305_2 arrive at reversed interfaces with respect to the previous example (i.e., host 305_1 sends packets to the IP address of interface 302_2 and host 305_2 sends packets to the IP address of interface 302_1). In this case, using the same interface tracking algorithm, functional layer 330 will identify interface 302_2 as the appropriate interface to send a packet to host 305_1 from and will also identify interface 302_1 as the appropriate interface to send a packet to host 305_2 from. The corresponding search keys will hit on entry 413 for the packet to be sent to host 305_1 and entry 414 for the packet to be sent to host 302_2. As such, the packet for host 305_1 will be sent into subnet 303_2 to gateway router 307 and the packet for host 305_2 will be sent into subnet 303_1 to gateway router 306. Entries 413 and 414 would be created in like fashion as entries 411 and 412.

Other examples demonstrate the versatility of the present routing approach. Consider (a perhaps unlikely) scenario where two applications residing on computing system 301 are respectively bound to interfaces en_1 (302_1) and en_2 (302_2) and the applications send packets to one another over network 104 (e.g., the first application causes a packet to be sent from en_1 to en_2 and the second application causes a packet to be sent from en_2 to en_1). The sending of the initial packets would cause the addition of entries 403, 404 to the routing table (i.e., entry 403 is for a packet being sent from en_1 to en_2 and entry 404 is for a packet being sent from en_2 to en_1).

As a further indication of the versatility of the present routing approach, if two different interfaces are coupled to the same subnet, input/output traffic from/to the subnet can still be made symmetrical through the interfaces consistent with the principles described above. That is, if two interfaces have the same IP subnet address, the tracking algorithm would identify the correct interface (i.e., the interface that the packet being responded to was received on) which, in turn, would trigger the correct deepest match hit in the routing table. That is, a search key of the form [[subnet_1.destination], interface_1] would hit on an entry of the form [subnet_1.x, interface_1] even though the routing table contained additional entries of the form [subnet_1.x, interface_2].

Identical Destination Addresses on Different Networks

Recall that the prior art approach, having only a single default entry was not capable of correctly sending packets for different, isolated networks having identical destination addresses. The improved approach of FIG. 3 does not suffer from this drawback. As observed in FIG. 4, the routing table 410 includes multiple entries 415, 417 having an identical IP destination address but for different networks 304_1, 304_2. Here, when multiple instances of the same destination address exist, functional layer 330 essentially selects the correct network through its identification of a particular interface. The routing table 510 of FIG. 5 demonstrates this capability explicitly by showing fully resolved destination addresses for hosts coupled to different networks. Specifically, as discussed above, entries 411 through 416 are for destinations on network 304_1 while entry 417 is for destination 305_4 on network 304_2. Note that entry 415 has the same destination address as entry 417 (192.168.1.10).

Reachability

Recall that another problem in the prior was the inability to reach more than one network whose destination address space could conceivably cover a wide range of numeric values. That is, the default entry was used as a mechanism to catch widely varied destination address values but, because the prior approach utilized only a single default entry, only a single network could be identified to handle a wide range of destination values. Specifically, an example was presented where either an interface for network 104_1 or an interface 102_5 for network 104_3 could be assigned the default entry. Network 104_1 was a large IP network and network 104_3 was the Internet. The interface 102_5 for WAN_1 was a PPP interface that used a modem or Ethernet network as an underlying physical medium. Essentially, the problem manifested itself as an inability to concurrently send packets both on network 104_1 beyond subnets 103_1 through 103_3 and on the Internet 104_3 because the single default entry could only be assigned to one of these networks.

FIG. 5 shows additional entries that may reside in the routing table presented in FIG. 4. Specifically, note the presence of a global or "unscoped" default entry 501 that does not identify a particular interface and that returns the interface 302_5 for WAN_1 as the appropriate interface. This configuration essentially indicates that any destination intended for the Internet, or for whom an appropriate network/interface could not be identified, has a corresponding search key that does not add interface information. Such a search key will hit on entry 501 causing the corresponding packet to be sent into the Internet 304_3. Concurrently, however, outbound packets can still reach any destination on network 304_1 at least by way of default entries 401 and 402 of FIG. 4. In this manner, a wide range of numeric destination addresses can be concurrently reached on more than one network.

Entries 502 and 503 correspond to entries added for a VPN network 304_4 (WAN_2) that corresponds to the VPN WAN_2 104_2 discussed in the background. Normally, a VPN informs the system 301 of routes/addresses to be used within the VPN network 304_4. According to one embodiment, the computing system 301 links these routes with an interface through which packets destined for the VPN will be sent. As such, a search key will created that includes a numeric identifier of the VPN ("17/8" which exists within the route itself) and the interface. The search key will hit on entry 503. Alternatively, if the computing system recognizes that the numeric identifier of the VPN is unique amongst the destination address values it manages (i.e., no other networks contemplate a destination address that begins with "17/8") entry 503 can remain "unscoped" (i.e., not include an interface identifier), and, routes are submitted to the routing table without any appended interface information. In this case entry 503 does not include interface information.

Either way, a hit on entry 503 returns the identity of the WAN_2 interface 302_6. The WAN_2 interface is embedded with both the identity of the VPN access node 305_6 (IP address=10.11.12.13) and the identity of the interface from which packets destined for the VPN will be transmitted from (en_1 302_1). Thus, the WAN_2 interface encapsulates the packet for the VPN with an IP packet whose destination address specifies 10.11.12.13 and submits a search key to the routing table that includes this IP address and the identity of the en_1 interface. This results in a hit on entry 502 which returns the IP address of the subnet gateway (192.168.1.11) and corresponding interface (en_1) of to the subnet from where the packet will be transmitted. In this particular example, the return of the next node information in entry 502 will be used to perform a lookup in the routing table that will hit on entry 420. This causes the outbound packet to be encapsulated with the MAC address of gateway 306 and transmitted from interface en1.

Determining the Interface Component of the Search Key

Figure 6:
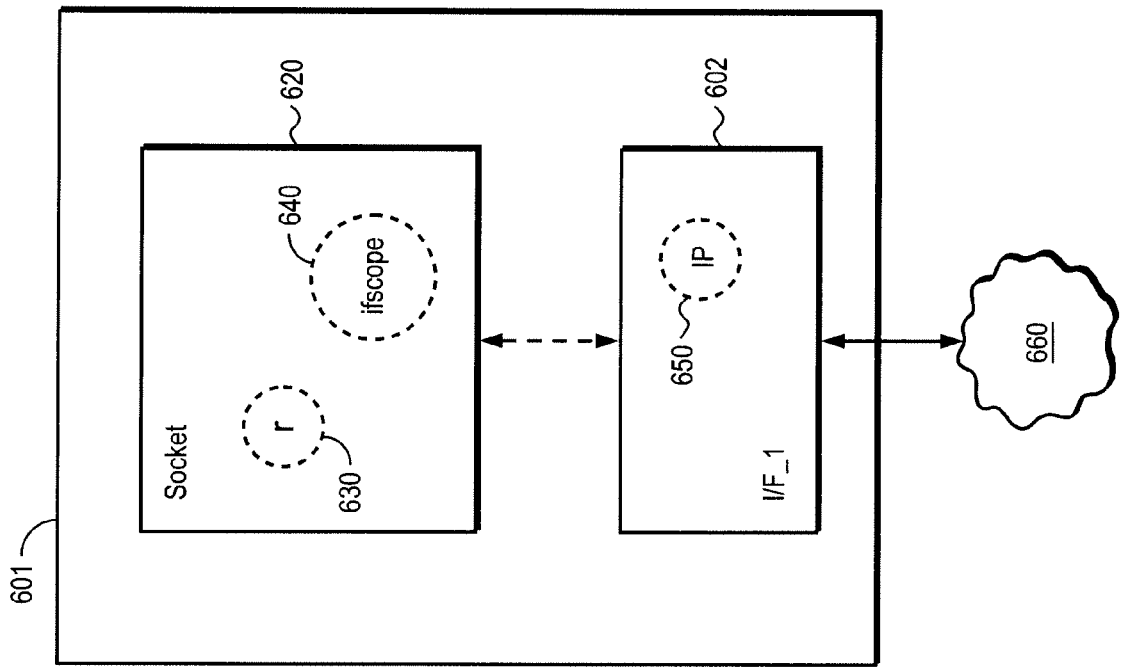
FIG. 6 shows an embodiment of an improved computing system having a socket containing an ifscope value and a cached route, and, a route lookup process that determines a scope value prior to performing a route lookup.
Figure 6:
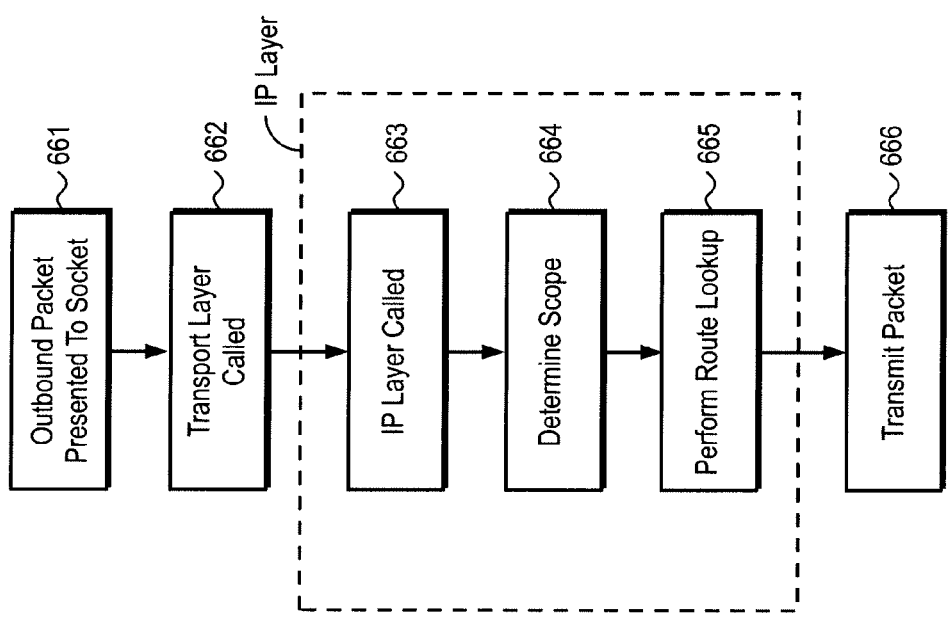

FIG. 6 depicts pertinent features concerning a process by which route entries may be "looked up" from a routing table (such as the routing table of FIG. 4). FIG. 6 shows a computing system 601 having an interface 650 (I/F_1) coupled to a network 660. Communication between a pair of computing systems coupled to one another through a network is typically accomplished through an exchange of packets over a connection or session that is established by the two systems. A common approach is for each system to internally establish a "socket" which represents the session/connection (e.g., a software construct and/or program code). Internally on one of the systems, packets for transport over the connection are delivered to the socket by an application engaged in substantive communication to the other system. The socket calls appropriate networking services such as transport layer services and networking layer services.

FIG. 6 depicts an exemplary socket 620 within computing system 601 that is used to implement a connection/session through interface 650. Notably, interface 650 may have one or more associated network addresses 650 (e.g., IP addresses) where each such network address is a recognized source/destination end point on network 660. In operation, initially, an outbound packet is presented to socket 620. The socket 620 calls a transport layer service (e.g., Transport Communication Protocol (TCP)) and recognizes the building of transport layer header information on the outbound packet. Next, the socket (or perhaps the transport layer service) calls the networking layer for networking layer services.

The network layer service identifies the correct next hop address of the packet and wraps the packet with, for instance, appropriate Layer 3 (e.g., Internet Protocol (IP) and/or Layer 2 (e.g., Ethernet) destination headers. As discussed at length above, the present approach contemplates the use of a routing table search key constructed from the packet's destination and an outbound interface identifier. The routing table (an example of which is observed in FIG. 4), accepts this specialized search key construct and returns next hop destination information for the outbound packet as well as the outbound interface of system 601 from which the packet should be transmitted.

According to one approach, meta data may be associated with (e.g., included within) the socket 620 (or other representation of the communication session/connection) that specifies the interface to be identified in the search key. For instance, FIG. 6 shows the presence of an "ifscope" value 640 and a cached route 630 within the body of the socket. The ifscope value is an identifier of an interface. The cached route is the result of a previous routing table lookup (i.e., next hop destination and outbound interface identification) that has been stored in the socket 630. In practice, one, both or none of these items 630, 640 may exist in the socket 620 when an outbound packet is presented to the socket for outbound transmission. As will be explained in more detail further below with respect to FIG. 7, the ifscope value 640 or the outbound interface portion of the cached route 630 may be used to set the interface component of the search key (hereinafter referred to as the search key's or lookup's "SCOPE" value).

FIG. 6 nevertheless shows the process flow at a high level. According to the process flow of FIG. 6, when the networking layer is called 663, the appropriate SCOPE value for the routing table search key is determined 664. As will be observed with respect to FIG. 7, depending on the circumstances, the SCOPE value may: 1) be a null value (i.e., no interface is specified); 2) specify a particular interface (e.g., by being based on the ifscope 640 or interface component of the cached route 630); 3) specify the primary interface. Once the SCOPE value is determined 664, a search key is constructed from the outbound packet's destination address and the SCOPE value and the lookup into the routing table is performed 665. The packet is then transmitted from the computing system 601 from the interface returned by the lookup table.

Figure 7:
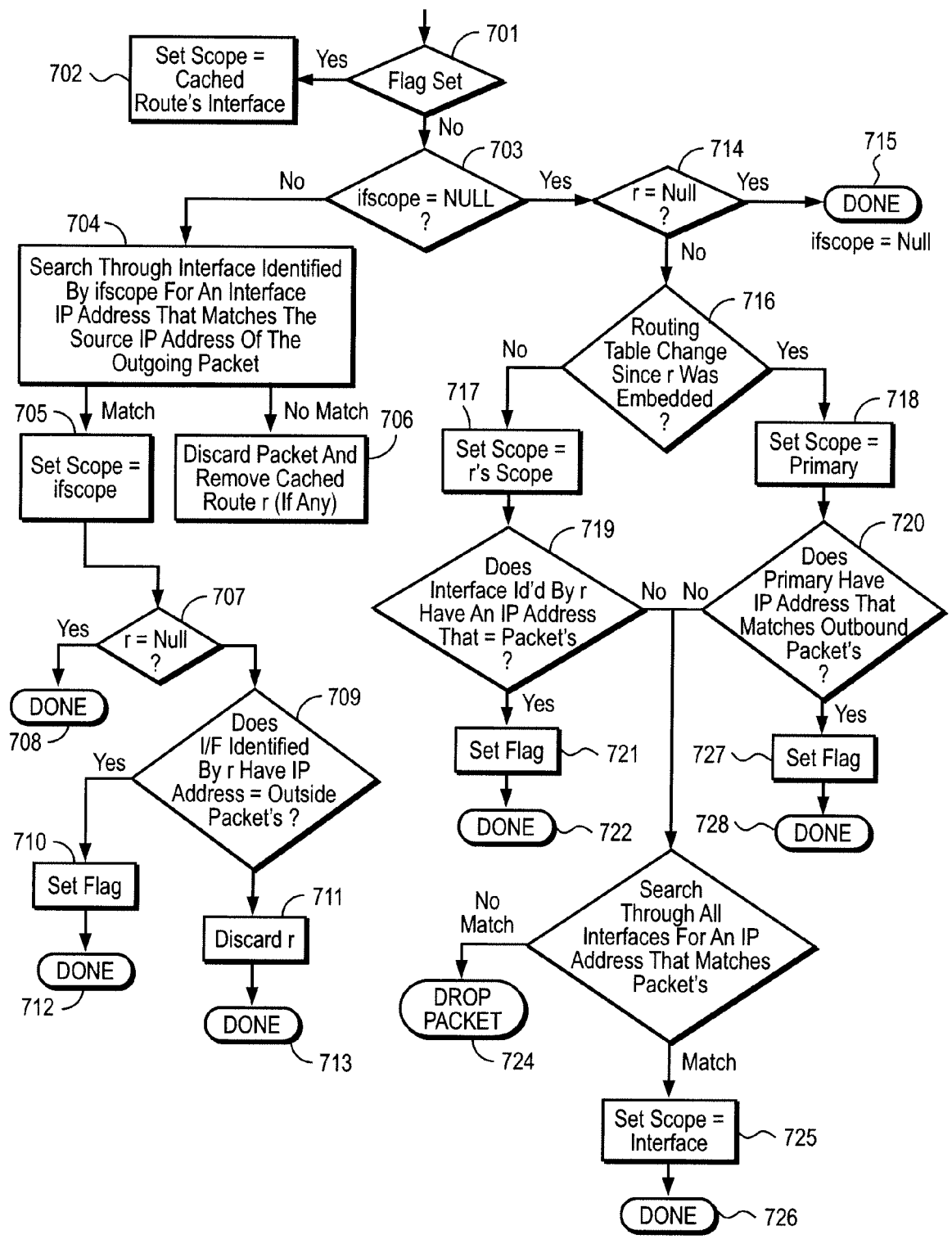
FIG. 7 shows a process for determining a scope value prior to performing a route lookup.

FIG. 7 shows an approach for determining the SCOPE value. According to the flow diagram of FIG. 7, the meta data in which the ifscope and cached route are kept may also store a flag that, when set, indicates that a cached route is "valid". That is, the cached route's interface component is safe to use for establishing the SCOPE value. Thus, according to the process of FIG. 7, if the flag is set 701, the cached route's interface component is used to set the SCOPE value 702. If the flag is not set, the next inquiry 703 is whether or not the socket contains an ifscope value 640 (if it does not, the ifscope value is said to be "NULL").

An ifscope value is a convenient way to specify a preferred outbound interface for a communication session or connection. For instance, if the communication session or connection is quasi-permanent (e.g., a quasi-permanent "pipe" is setup between the computing system and its communication partner), an ifscope value that identifies the outbound interface through which the communication emanates may be written into the socket or corresponding meta data. As another example, the outbound packets emitted by an application may be "bound" to a particular interface by configuring the application to submit packets to a particular socket and writing an ifscope value within the socket that identifies the interface. As another example, an initial received packet to initiate a communication session/connection with the computing system may be processed through a particular socket. The interface that the packet was received on is then identified in the socket (e.g., with a specific ifscope value). Thereafter, any outgoing packets for the communication session/connection are directed to the socket thereby binding any such outgoing packets to the appropriate interface.

From FIG. 7, if the ifscope value is not null (i.e., an ifscope value exists), the interface identified by the ifscope value is searched for an IP address that matches the source IP address of the outgoing packet. Here, recall that one or more IP addresses for a particular network can be associated with a specific interface such that packets being sent to/from one of these IP addresses on the network will flow through the interface. Thus, process 704 essentially attempts to confirm that the interface identified by the ifscope value has an associated IP address that the outgoing packet is supposed to be sent from.

If there is no match, the packet is discarded and any cached route within the socket is discarded 706. If there is a match, the SCOPE value for the lookup search key is set to a value that corresponds to the interface identified by the ifscope value 705. Next, if the socket does not contain a cached route (r=NULL) 707, the process is finished 708. Because the socket does not contain a cached route, the result of the immediately following route table lookup will be stored in the socket as the cached route. As such, conceivably, the next time an outbound packet is presented to the socket, the answer to inquiry 707 will be "no" (i.e., a cached route now exists). The cached route is then checked for an IP address that matches the source address of the outgoing packet 709. That is, the validity of the routing table output is verified. If the cached route's interface contains an IP address that matches the source IP address of the outgoing packet, the flag is set 710 indicating the cached route is valid (as such, the next time a packet for this session/connection is presented the SCOPE value determination process will terminate at step 702 so as to avoid the time consuming searching processes 704, 709).

If there is no match, the cached route is discarded 711 and the process is finished 713. Note that processes 709, 711 will also expunge an earlier, now stale cached route in the socket is used for a "new" or different connection. That is, if the socket is used for a new connection and updated with a new ifscope value but an earlier—now inappropriate—cached route is not expunged from the socket, the first time a packet for the new connection is presented to the socket the answer to inquiry 707 will be "no" and processes 709 and 711 will discard the stale cached route. The result from the routing table lookup will then be cached in the socket such that the next packet for the connection will trigger process 707 and 709 with the hope that the flag gets set 710.

Returning to process 703, note that it is possible that a socket simply may not be configured with an ifscope value. If the socket does not contain an ifscope value 703 or a cached route 714 the SCOPE value is set to null and the process is complete 715. In this case, as will be explained in more detail below, the interface component of the routing table lookup search key is set to a NULL value. If ifscope is null but a cached route exists, an inquiry is made that checks whether there was a routing table change 716 since the cached route was embedded in the socket. If the routing table has not been changed, SCOPE is set to a value that reflects the interface component of the cached route 717. Then, the interface identified by the cached route is checked for an IP address that matches the source IP address of the outgoing packet 719.

If there is a match, the flag is set 721 and the process is complete 722. If a match does not result, the different interfaces within the computing system are searched continuously looking for an interface having the packet's source IP address 723. If no such interface is found, the packet is dropped and the cached route is discarded 724. If such an interface is found, the SCOPE value is changed to a value that identifies the interface found through process 723. At this point the process is complete, however, the result of the subsequent route table lookup is cached in the socket.

Returning back to process 716, if there was a routing table change since the cached route was embedded in the socket, the SCOPE is set to a value that identifies the primary network (if one exists). The primary interface is then checked to see if it has an associated IP address that matches the source IP address of the outgoing packet. If it does, the flag is set 727 and the process is complete 728. If it does not, process 723 and the subsequent processes as described above are performed.

Routing Table Lookup

Figure 8:
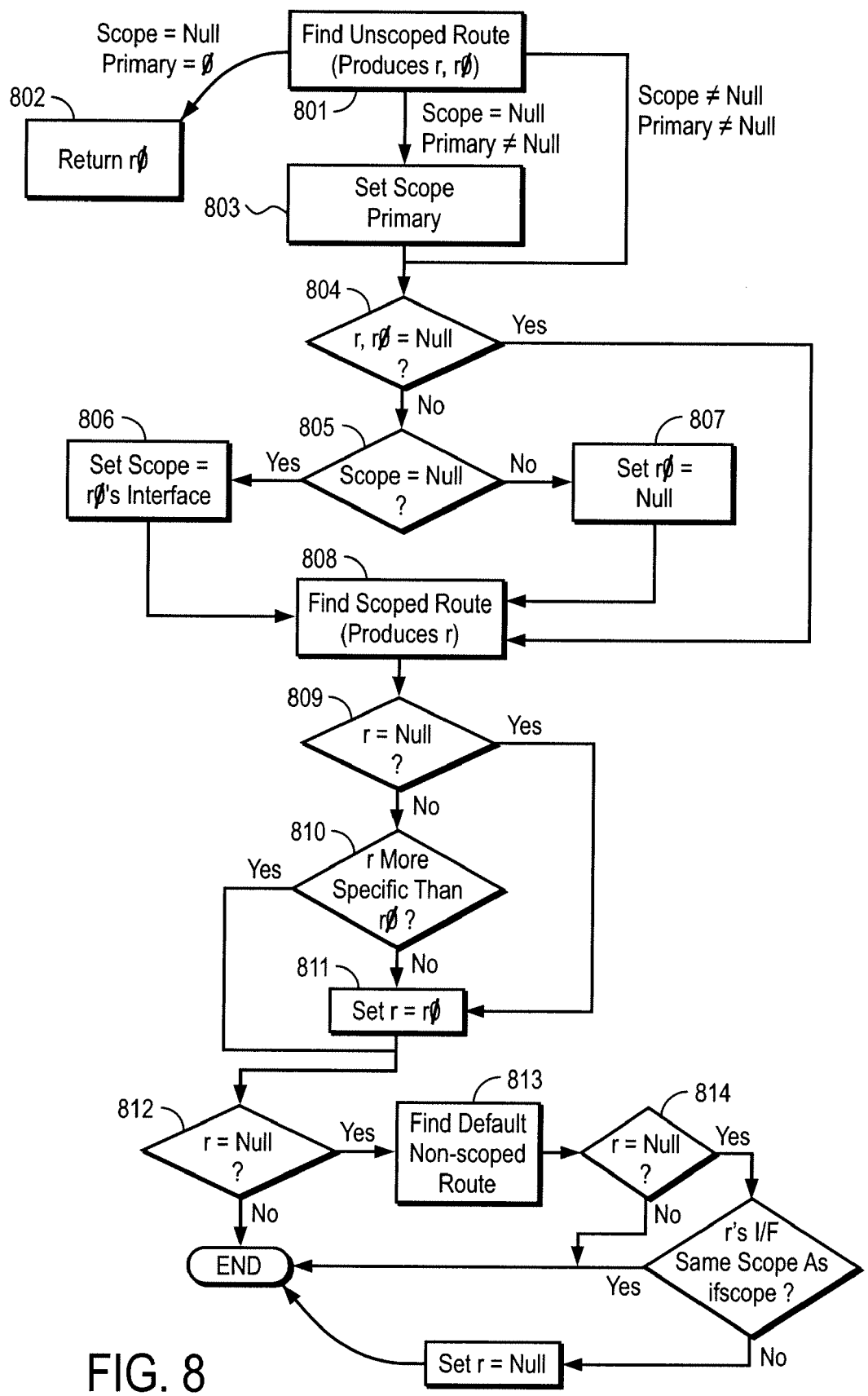
FIG. 8 shows a route lookup process that contemplates a search key having a scope value.

Returning back to FIG. 6, after a SCOPE value is determined 644 a route lookup is performed 665 with a search key constructed from the destination address and the SCOPE value. FIG. 8 shows an embodiment of a process for performing the route lookup. According to the process of FIG. 8, initially, an "unscoped" route lookup is performed 901. As alluded to above with respect to FIG. 5, and as will be discussed again further below with respect to FIG. 9, the routing table may include both "scoped" and "unscoped" entries. Scoped entries are entries whose corresponding search key includes a true interface component. By contrast, unscoped entries are entries whose corresponding search key includes a NULL interface component. Search keys having a non NULL interface value will therefore match on scoped entries and search keys having a NULL interface value will match on unscoped entries. According to an implementation, two different values "r" and "r0" are both set to the result of the unscoped route lookup.

If the interface component of the search key is NULL and there is no primary network, the unscoped lookup result (r or r0) is returned as the final result 802. If the interface component of the search key is set to NULL and there is a primary network the SCOPE value is set to a value that corresponds to the primary network's interface 803. Here, the "primary" network's interface corresponds to the interface of the global default route. So, in the example of FIGS. 4 and 5, the primary network interface corresponds to the WAN_1 interface (see entry 501 of FIG. 5). In the case where the interface component of the search key is not set to NULL, an inquiry is made to see if the unscoped lookup 801 returned a NULL value or not. If the unscoped route lookup 804 did not produce a NULL result (i.e., r, r0 contain a destination address and outbound interface) and the SCOPE value is NULL 805, the SCOPE value is reset to a value that corresponds to the interface component of r, r0 806. By contrast, if the unscoped route lookup 804 did not produce a NULL result (i.e., r, r0 contain a destination address and outbound interface) and the SCOPE value is not NULL 805, r0 value is cleared leaving only r 807.

Regardless, the existence of a SCOPE value that is not NULL causes a scoped looked to be performed 808. The result is entered into r, thus, if r0 still exists, there exists both an r value (scoped route result) and an r0 value (unscoped route result). If the scoped lookup result r is NULL 809, the value of r is set equal to r0 (thus r=r0) 811. If the scoped result r is not NULL 809, an inquiry is made into the specificity of r vs. the specificity of r0 810. For instance, a Layer 2 result (e.g., the MAC address on an Ethernet subnet) is deemed to be more specific than a Layer 3 result (e.g., an IP address). If r is not more specific than r0, r is set equal to r0. Next, or r is more specific than r0, an inquiry is made into the status of r. If r is not null, the process is complete 817 and r is returned as the route lookup result.

If r is null, the destination component of the search key is set to the default value (0.0.0.0) and another lookup is performed 813 to produce a new value for r. If r is a NULL 814, the process is complete and route lookup returns a NULL as a final result 817. If the result is not a NULL, the interface component of the result is compared against the SCOPE value. 815 If they match, the process is complete and r is returned as the lookup result. If they do not match, r is set to NULL, the process is complete and a NULL value is returned as the lookup result.

Routing Table Build

Figure 9:
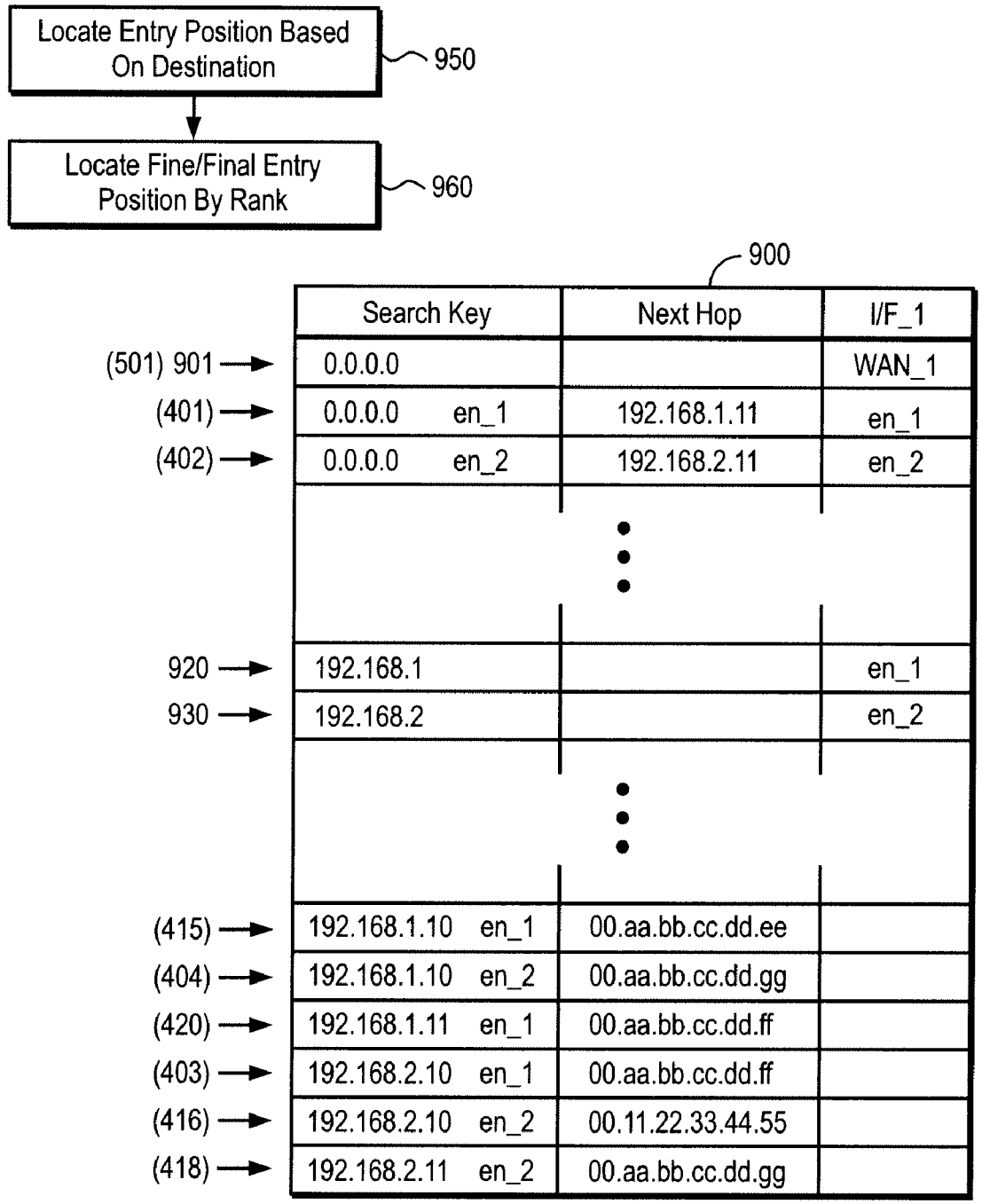
FIG. 9 shows an implementation of a routing table and a process for adding entries to the routing table.

FIG. 4 disclosed an embodiment of a routing table that served the purpose of easily describing a routing table that can receive a search key composed of a destination and an interface identifier. FIG. 9 shows another embodiment of such a routing table. The routing table depiction 900 of FIG. 9 is composed of "rearranged" entries that appear in FIG. 4 and FIG. 5.

Referring to FIG. 9, the "top" 901 of the routing table includes the "global" default entry 501 of FIG. 5. Recall that the global default entry can be used as a "catch-all" for specific destinations that do not have an entry in the routing table but that nevertheless can be reached. For instance, the global default entry 901 may identify an outbound interface through which the Internet is reached (because the Internet supports a vast number of destination addresses that the routing table cannot list the entire set of). In operation, the routing table returns the next hop and outbound interface for the entry whose search column component has the "longest prefix match" with the search key. Thus, in an embodiment, the default entry 901 has a 0.0.0.0 search column destination component because essentially random destination addresses (such as those associated with the Internet) will exhibit a closest match with 0.0.0.0 as opposed to the specific addresses listed elsewhere in the table.

A subnet will introduce two entries to the table, a "default" entry for the subnet and a "subnet entry" for the subnet. As observed in FIG. 9, for subnet 192.168.1, entry (401) corresponds to the default entry and entry 920 corresponds to the subnet entry. Here, default entry (401) of FIG. 9 essentially corresponds to default entry 401 of FIG. 4. Likewise, the subnet entry 920 for subnet 192.168.1 in FIG. 9 is represented in FIG. 4 just above the default entry. An analogous set of default and subnet entries (402), 930 are also observed in FIG. 9 for subnet 192.168.2.

Comparing FIGS. 4 and 9, however, note that the subnet default entries (401), (402)—like the global default entry 901—are represented with a destination value of 0.0.0.0. The routing table physically lists entries in numerical order. That is, search column entries with lower numeric values will reside above search column entries with higher numeric values. Because the default entries 901, (401), (402) have the lowest numeric destination values in the table (0.0.0.0) they reside at the top of the table. The global default entry 901 is "unscoped" (i.e., does not have an associated interface value in its search column) whereas the subnet default entries (401) and (402) are "scoped". That is, entry (401) has an identifier of interface en_1 in its search column and entry (402) has an identifier of interface en_2 in its search column.

According to an embodiment, a number of "sort policies" are applied to the entries in the table so that their order in the table is properly implemented. A first sort policy, as mentioned just above, is to sort entries based on the numerical value within the search column. A second sort policy is that amongst a collection of entries having identical destination, one of these entries is left unscoped while the remaining entries are scoped. Both of these policies can be observed in the default entries 901, (401), (402) of FIG. 9.

With respect to the first policy, entry 901 does not have an interface component in its search column and therefore is numerically less than entries (401) and (402). Entry (401) is numerically less than entry (402) because interface component "en_1" is presumed to be numerically less than interface component "en_2". The same principle is observed with respect to the remaining table entries observed in FIG. 9.

With respect to the second sort policy, each of entries has a destination value of 0.0.0.0. Therefore, according to the policy, one must be chosen as the unscoped entry. In an embodiment, the manner of choosing the unscoped entry is as follows. Firstly, an "automatic" sorting policy is applied based on the type of network service. According to one approach, the automatic sorting policy ranks network services more prone to be Internet connections or otherwise connected to networks having a wide range of potential destination addresses are ranked higher than network services that are less prone to be Internet connections or supportive of a large destination address range. For example, the following automatic sorting policy is emblematic of such an approach: 1) serial-based PPP (greatest propensity to be an Internet connection); 2) Ethernet; 3) Firewire; 4) wireless (least propensity to be an Internet connection).

Above and beyond the automatic sorting policy, however, specific ranking criteria may be explicitly applied to any route. For instance, according to one embodiment, any route may be labeled as one of: 1) "sort first"; 2)"sort last"; 3) "never unscoped". Reviewing the default entries 901, (401), (402), it is clear that entry 901 has been chosen to be the unscoped entry over and above entries (401) and (402). Any of the following scenarios could have established this sort order:

1) the network service of entry 901 (through interface WAN_1) was deemed by the automatic sorting policy to have a greater propensity to be an Internet connection than the network services of entries (401) and (402) (Ethernet)—and—the explicit rank labels (first, last, never unscoped), if any, did not overrule the automatic sorting (i.e., neither of entries (401), (402) were ranked "first" and entry 901 was not ranked "sort last" or "never unscoped");
2) the network service of entry 901 was ranked "sort first";
3) the network service of entry (401) and/or (402) was ranked "sort last" or "never unscoped"; etc.

When a search key having a SCOPE of NULL is presented to the routing table, only entry 901 (being the only unscoped entry observed in the table) is within the set of entries that are searched for a longest prefix match. The remaining entries observed in the routing table 900 of FIG. 9 are not searched when SCOPE is NULL because the remaining entries have an interface component within their respective search column entry. That, is an unscoped search key will only return an uscoped search result. In practice multiple unscoped entries are possible, however, because there may be additional instances of identical destination component but different interface component (e.g., entry pair 411 and 413 of FIG. 4, entry pair 412 and 414 of FIG. 4, etc). The same sorting criteria described above would be applied to such entries (e.g., one of entries 411 and 413 would be unscoped).

In operation, the routing table of FIG. 9 is utilized much the same as the table observed in FIG. 4. That is, for example, an unscoped, essentially random Internet destination will have a deepest match on entry 901 and therefore be processed by WAN_1. As another example, a destination of 1.2.3.4 and a scope of en_1 will have a deepest match on entry (401) which returns the gateway (192.168.1.11) for subnet 192.168.1 (303_1), which causes a second scoped lookup that will have a deepest match on entry (420). A "new" destination for subnet 192.168.1 (303_1) (e.g., 192.168.1.9 with scope en_1) will have a deepest match on entry 920 which will cause an address inquiry into subnet 192.168.1 (303_1) for the MAC layer address on that subnet and a new entry to be inserted (just above entry (415)) in the table. Note that if there were additional interfaces each configured to be on subnet 192.168.1 and 192.168.2 respectively then there would be both an unscoped and scoped entry for 192.168.1 and 192.168.2.

FIG. 9 also shows a methodology by which the routing table is populated. According to the methodology of FIG. 9, when a new entry is to be added to the table, the "initial" location is identified 950 by its destination 901. For example, if another default entry of destination 0.0.0.0 were to be added to the table, the region of entries 901, (401), (402) would be initially identified as the correct realm for insertion of the entry. The sorting criteria would then be applied 960. For instance, if the new entry was labeled "rank first" it would displace entry 901 at the top of the table.

As a final, additional comment. Recall from the discussion of FIG. 7 that an interface might be searched through to discover what source address it supports (e.g., box 704 of FIG. 4). In an embodiment, the source IP address of a route is embedded in the route entry in the table. In this manner searches can be performed on a particular interface that returns all of that interface's supported source IP addresses.

Closing Comments

Figure 10:
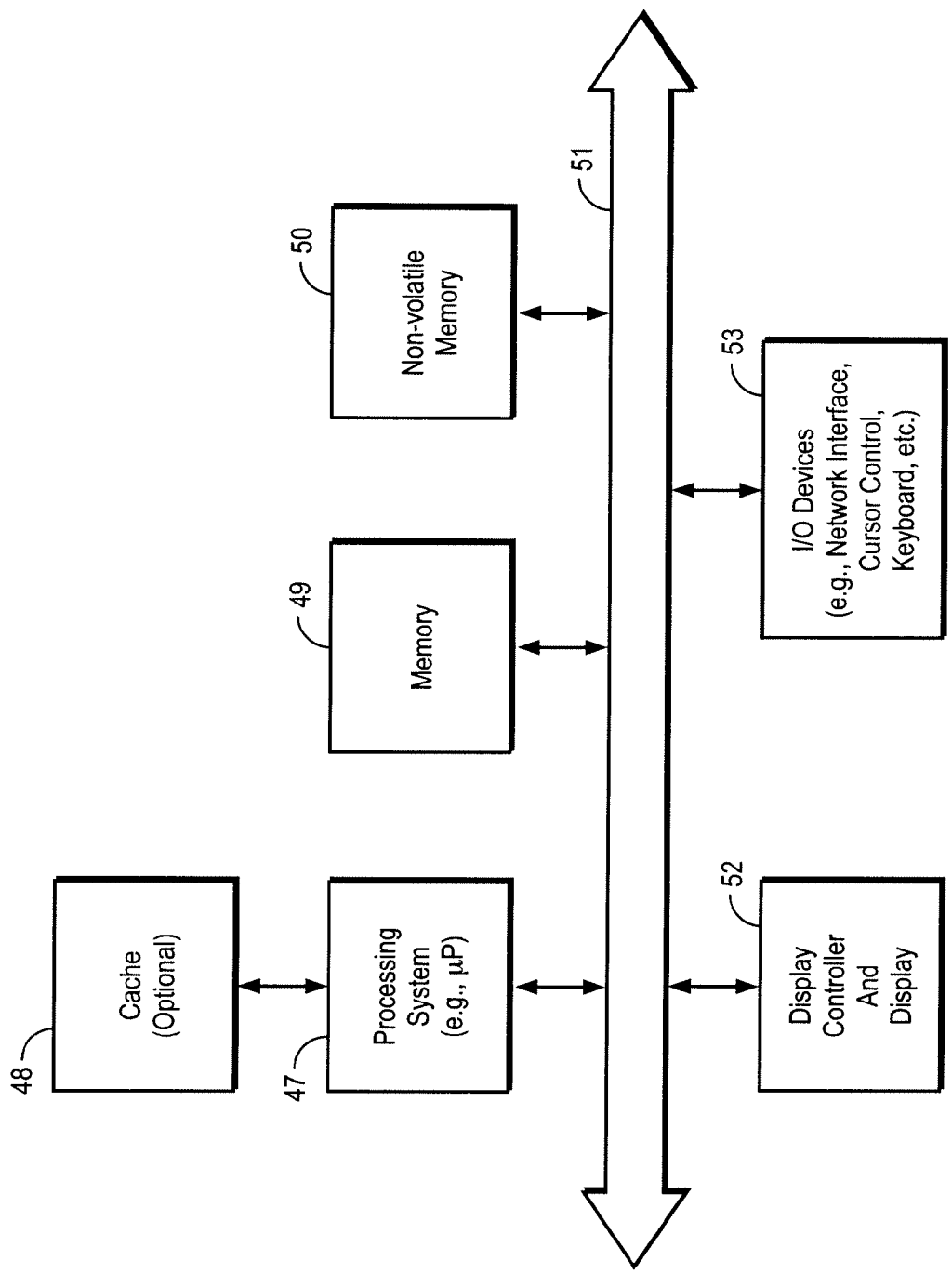
FIG. 10 shows an embodiment of a computing system.

FIG. 10 shows one example of a typical computing system (or "computer system") which may be used with the present invention. Note that while FIG. 10 illustrates various components of a computer system, it is not intended to represent any particular architecture or manner of interconnecting the components as such details are not germane to the present invention. It will also be appreciated that personal digital assistants (PDAs), cellular telephones, handheld computers, media players (e.g. an iPod), entertainment systems, devices which combine aspects or functions of these devices (e.g. a media player combined with a PDA and a cellular telephone in one device), an embedded processing device within another device, network computers, a consumer electronic device, and other data processing systems which have fewer components or perhaps more components may also be used with or to implement one or more embodiments of the present invention. The computer system of FIG. 10 may, for example, be a Macintosh computer from Apple Inc. The system may be used when programming or when compiling or when executing the software described.

As shown in FIG. 10, the computer system 45, which is a form of a data processing system, includes a bus 51 which is coupled to a processing system 47 and a volatile memory 49 and a non-volatile memory 50. The processing system 47 may be a microprocessor from Intel which is coupled to an optional cache 48. The bus 51 interconnects these various components together and also interconnects these components to a display controller and display device 52 and to peripheral devices such as input/output (I/O) devices 53 which may be mice, keyboards, modems, network interfaces, printers and other devices which are well known in the art. Typically, the input/output devices 53 are coupled to the system through input/output controllers. The volatile memory 49 is typically implemented as dynamic RAM (DRAM) which requires power continually in order to refresh or maintain the data in the memory. The nonvolatile memory 50 is typically a magnetic hard drive, a flash semiconductor memory, or a magnetic optical drive or an optical drive or a DVD RAM or other types of memory systems which maintain data (e.g. large amounts of data) even after power is removed from the system. Typically, the nonvolatile memory 50 will also be a random access memory although this is not required. While FIG. 10 shows that the nonvolatile memory 50 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 51 may include one or more buses connected to each other through various bridges, controllers and/or adapters as is well known in the art.

It will be apparent from this description that aspects of the present invention may be embodied, at least in part, in software. That is, the techniques may be carried out in a computer system or other data processing system in response to its processor, such as a microprocessor, executing sequences of instructions contained in a machine readable storage medium such as a memory (e.g. memory 49 and/or memory 50). In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the processing system 47.

It is worthwhile to point out that although the above routing table scenarios were described in relation to a single computing system, a number of such computing systems configured with the routing techniques described herein could be coupled to one or more networks, and, with each such system using the routing techniques discussed herein, engage in communication with one another.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A method performed on a computing system, comprising:
where said computing system is positioned as an endpoint coupled to a network: in view of a first default entry for a first subnet of the network that is reachable through a first network service, said first default entry having a numeric destination value, and in view of a second default entry for a second subnet of the network that is reachable through a second network service, said second default entry having said numeric destination value, sorting said first and second default entries by deciding that said first network service is ranked higher than said second network service;
configuring said first default entry within a routing table to have said numeric destination and no interface component within said first default entry's search term;
configuring said second default entry within said routing table to have said numeric destination and an identifier of said second network service's interface within said computing system within said second default entry's search term;
returning said numeric destination and no interface component responsive to an unscoped search key matching said first default entry's search term; and
returning said numeric destination and the identifier of said second network service's interface within said computing system responsive to a scoped search key matching said second default entry's search term.

2. The method of claim 1 wherein said first network service is used to send to traffic into the Internet.

3. The method of claim 2 wherein said first network service is a PPP network service.

4. The method of claim 2 wherein said second network service is any of:
an Ethernet service; and
a wireless service.

5. The method of claim 1 wherein said first network service was labeled to be ranked first.

6. The method of claim 1 wherein said second network service was labeled to be ranked last.

7. The method of claim 1 wherein said first network service was labeled to not be scoped.

8. The method of claim 1 wherein said method further comprises adding a first subnet entry for said first subnet into said routing table and adding a second subnet entry for said second subnet into said routing table.

9. The method of claim 8 wherein said first subnet entry's search term includes said first subnet's address and said second subnet entry's search term includes said second subnet's address.

10. The method of claim 9 wherein said first subnet entry's search term also includes said first network service's interface and said second subnet entry's search term also includes said second network service's interface.

11. A machine readable non-transitory storage medium containing program code which when processed by a processing unit of a computing system causes a method to be performed, said method comprising:
where said computing system is positioned as an endpoint coupled to network:
in view of a first default entry for a first subnet of the network that is reachable through a first network service, said first default entry having a numeric destination value, and in view of a second default entry for a second subnet of the network that is reachable through a second network service, said second default entry having said numeric destination value, sorting said first and second default entries by deciding that said first network service is ranked higher than said second network service;
configuring said first default entry within a routing table to have said numeric destination and no interface component within said first default entry's search term;
configuring said second default entry within said routing table to have said numeric destination and an identifier of said second network service's interface within said computing system within said second default entry's search term;
returning said numeric destination and no interface component responsive to an unscoped search key matching said first default entry's search term; and
returning said numeric destination and the identifier of said second network service's interface within said computing system responsive to a scoped search key matching said second default entry's search term.

12. The machine readable storage medium of claim 11 wherein said first network service is used to send to traffic into the Internet.

13. The machine readable storage medium of claim 12 wherein said first network service is a PPP network service.

14. The machine readable storage medium of claim 12 wherein said second network service is any of:
an Ethernet service; and
a wireless service.

15. The machine readable storage medium of claim 11 wherein said first network service was labeled to be ranked first.

16. The machine readable storage medium of claim 11 wherein said second network service was labeled to be ranked last.

17. The machine readable storage medium of claim 11 wherein said first network service was labeled to not be scoped.

18. The machine readable storage medium of claim 11 wherein said method further comprises adding a first subnet entry for said first subnet into said routing table and adding a second subnet entry for said second subnet into said routing table.

19. The method of claim 18 wherein said first subnet entry's search term includes said first subnet's address and said second subnet entry's search term includes said second subnet's address.

20. The machine readable storage medium of claim 19 wherein said first subnet entry's search term also includes said first network service's interface and said second subnet entry's search term also includes said second network service's interface.

21. A computing system to be positioned as an endpoint coupled to a network, comprising:
in view of a first default entry for a first subnet of the network that is reachable through a first network service, said first default entry having a numeric destination value, and in view of a second default entry for a second subnet of the network that is reachable through a second network service, said second default entry having said numeric destination value:
means for sorting said first and second default entries, including means for ranking said first network service higher than said second network service;
means for configuring said first default entry within a routing table to have said numeric destination and no interface component within said first default entry's search term;
means for configuring said second default entry within said routing table to have said numeric destination and an identifier of said second network service's interface within said computing system within said second default entry's search term;
means for returning said numeric destination and no interface component responsive to an unscoped search key matching said first default entry's search term; and
means for returning said numeric destination and the identifier of said second network service's interface within said computing system responsive to a scoped search key matching said second default entry's search term.

22. A computing system comprising a processing unit and a storage device having program code to be processed by said processing unit to perform a method, said method comprising:
where said computing system is positioned as an endpoint coupled to a network:
in view of a first default entry for a first subnet of the network that is reachable through a first network service, said first default entry having a numeric destination value, and in view of a second default entry for a second subnet of the network that is reachable through a second network service, said second default entry having said numeric destination value, sorting said first and second default entries by ranking said first network service higher than said second network service;
configuring said first default entry within a routing table to have said numeric destination and no interface component within said first default entry's search term;
configuring said second default entry within said routing table to have said numeric destination and an identifier of said second network service's interface within said computing system within said second default entry's search term;
returning said numeric destination and no interface component responsive to an unscoped search key matching said first default entry's search term; and
returning said numeric destination and the identifier of said second network service's interface within said computing system responsive to a scoped search key matching said second default entry's search term.

23. The method of claim 22 wherein said first network service is used to send traffic into the Internet.

24. The method of claim 23 wherein said first network service is a PPP network service.

25. The method of claim 23 wherein said second network service is any of:
an Ethernet service; and
a wireless service.

26. The method of claim 22 wherein said first network service was labeled to be ranked first.

27. The method of claim 22 wherein said second network service was labeled to be ranked last.

28. The method of claim 22 wherein said first network service was labeled to not be scoped.

29. The method of claim 22 wherein said method further comprises adding a first subnet entry for said first subnet into said routing table and adding a second subnet entry for said second subnet into said routing table.

30. The method of claim 8 wherein said first subnet entry's search term includes said first subnet's address and said second subnet entry's search term includes said second subnet's address.

31. The method of claim 9 wherein said first subnet entry's search term also includes said first network service's interface and said second subnet entry's search term also includes said second network service's interface.

* * * * *